United States Patent
Lee (10) Patent No.: US 11,789,945 B2
(45) Date of Patent: Oct. 17, 2023

(54) CLAUSE-WISE TEXT-TO-SQL GENERATION

(71) Applicant: SAP SE, Walldorf (DE)

(72) Inventor: Dongjun Lee, Seoul (KR)

(73) Assignee: SAP SE, Walldorf (DE)

( * ) Notice: Subject to any disclaimer, the term of this patent is extended or adjusted under 35 U.S.C. 154(b) by 338 days.

(21) Appl. No.: 16/705,570

(22) Filed: Dec. 6, 2019

(65) Prior Publication Data

US 2020/0334252 A1 Oct. 22, 2020

Related U.S. Application Data (60) Provisional application No. 62/835,588, filed on Apr. 18, 2019.

(51) Int. Cl.
*G06F 16/2452* (2019.01)
*G06N 3/08* (2023.01)
*G06F 16/242* (2019.01)

(52) U.S. Cl.
CPC ...... *G06F 16/24522* (2019.01); *G06F 16/243* (2019.01); *G06N 3/08* (2013.01)

(58) Field of Classification Search
CPC ... G06F 16/24522; G06F 16/243; G06N 3/08; G06N 3/0445; G06N 3/0454; G06N 20/00
See application file for complete search history.

(56) References Cited

U.S. PATENT DOCUMENTS

| | | | | |
|---|---|---|---|---|
| 2012/0158628 A1* | 6/2012 | Junker | ................. | G06Q 10/103 706/14 |
| 2016/0140123 A1* | 5/2016 | Chang | ............... | G06F 16/24522 707/760 |
| 2016/0147847 A1* | 5/2016 | Lakshmanan | .......... | G06N 20/00 706/12 |
| 2016/0171050 A1* | 6/2016 | Das | ................... | G06F 16/90332 707/718 |
| 2017/0075891 A1* | 3/2017 | Bozkaya | ............... | G06F 16/243 |
| 2018/0336198 A1* | 11/2018 | Zhong | ............... | G06F 16/24522 |
| 2020/0073983 A1* | 3/2020 | Sen | ........................ | G06F 16/243 |
| 2020/0184017 A1* | 6/2020 | Batra | ...................... | G06F 16/95 |
| 2020/0244621 A1* | 7/2020 | Lai | ...................... | G06F 16/3347 |

OTHER PUBLICATIONS

Ruichu; Cai et al., An Encoder-Decoder Framework Translating Natural Language to Database Queries, Jun. 9, 2018, Faculty of Computer, Guangdong University of Technology, China Singapore R&D, Yitu Technology Ltd. (Year: 2018).*

* cited by examiner

*Primary Examiner* — Richard L Bowen
*Assistant Examiner* — Aryan D Toughiry
(74) *Attorney, Agent, or Firm* — Buckley, Maschoff & Talwalkar LLC

(57) ABSTRACT

Provided is a system and method for generating an SQL operation from a natural language input using neural networks which works on data from a database that has not been seen before by the neural networks. In one example, the method may include receiving a natural language input, determining, via a first predictive module, a data structure of a SQL operation based on text included in the natural language input, filling in, via a second predictive module, one or more empty slots of the data structure of the SQL operation with text based on column names of a database and the text included in the natural language input, and storing the filled-in data structure of the SQL operation in a storage.

20 Claims, 8 Drawing Sheets

CLAUSE-WISE TEXT-TO-SQL GENERATION

CROSS-REFERENCE TO RELATED APPLICATION(S)

This application claims the benefit under 35 USC § 119(e) of U.S. Provisional Patent App. No. 62/835,588, filed on Apr. 18, 2019, in the United States Patent and Trademark Office, the entire contents of which are hereby incorporated by reference for all purposes.

BACKGROUND

Natural language processing is a technology that enables a computer to understand a human's natural language. Examples of natural language include English, French, Chinese, and the like, and should not be confused with computer programming languages such as C, Java, Python, etc. Teaching a machine to understand how humans communicate is not an easy task. The objective of natural language processing is to program the computer to read, decipher, understand, and make sense of human languages in a manner that provides value. Early natural language processing systems were based on hard-coded rules. The rules were typically used to parse and pattern match speech to particular words. However, a rule-based approach is generally of low precision and only effective in specific use cases.

More recent natural language processing systems rely on the use of machine learning. Traditional machine learning includes probabilistic modeling, likelihood maximization, and linear classifiers. Other approaches involve the use of neural networks. In either case, the machine learning system "learns" from training data. For example, neural networks "learn" important features through many training runs. However, neural networks are typically database specific. In particular, the training of the neural network is typically based on a schema of the database (e.g., table names, data relationships, etc.) which are unique to the database. Therefore, a predictive model that works on one database will not be very effective on a different database as a result of the different schemas.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

A text-to-SQL model which can be used to convert a natural language input into a SQL operation (such as a SQL query, etc.) is typically trained for one database. Databases use different schemas including table names, keys, and the like. Therefore, a typical predictive model (e.g., a neural network, etc.) which is trained on a first database will not work properly on a second database unless the schemas are identical. The example embodiments overcome this problem by introducing a general text-to-SQL system that can be applied to any database. Furthermore, the text-to-SQL system can work on multiple types of databases and database schemas, including unseen database schemas. The text-to-SQL system architecture may include a plurality of modules, and the modules may include a plurality of sub-modules. Each module and sub-module may perform predictions using deep learning, and the like.

The text-to-SQL system may include a first predictive module, for example, a long short-term memory (LSTM) neural network which can predict a sketch of a SQL operation based on a natural language input. Each SQL operation may include various clauses and statements including a SELECT statement, a FROM statement, a WHERE clause, an ORDER BY clause, a GROUP BY clause, a LIMIT clause, and the like. In addition, each clause and statement may include expressions, operators, and other variables. The first predictive module may predict a data structure of the SQL operation.

For example, the data structure may be a skeleton of the SQL operation with empty slots to be filled-in by other predictive modules further described herein. As an example, the first predictive module may predict how many expressions are included within a SELECT statement, a WHERE clause, a GROUP BY clause, and a HAVING clause. As another example, the first predictive module may predict whether or not the SQL operation includes an ascending or descending order, whether the SQL operation includes an EXCEPT, UNION, INTERSECT, etc., operator, and the like. The result of the first neural network is a template with different slots to be filled-in. To perform the different predictions, the first predictive module may actual consists of a group of sub-modules. Each sub-module may be associated with one of the statements or clauses in the SQL operation. For example, one sub-module may predict the number of expressions in the SELECT statement while another sub-module may predict the number of expressions in the HAVING clause, etc.

The text-to-SQL system may also include a second predictive module, for example, an encoder-decoder neural network that can fill-in the empty slots of the SQL operation. For example, the second predictive module may predict column names that correspond to the expressions within the empty slots in the skeleton. Here, the second predictive module can identify column names from the underlying database that match or most closely match the words in the natural language input based on vector conversions. The text-to-SQL system may also include a third predictive module, for example, another encoder-decoder neural network which can predict operators for each of the different statements and clauses of the SQL operation. Here, the third predictive module may perform its prediction based on the column names determined by the second predictive module. The text-to-SQL system may also include other predictive modules such as a nested query predictive module which can predict whether there is a nested query within a statement. Then, the nested query can be predicted by the same model architecture using recursion.

The architecture of the text-to-SQL system is new. The architecture includes the use of multiple neural networks (i.e., deep learning) to determine a skeleton/structure of the statements and clauses of an SQL operation, and then fill-in empty slots of the skeleton. The filling-in includes SQL clause-wise decoding. Here, each clause-specific decoder consists of a set of sub modules. The architecture also works recursively enabling it to predict nested queries (complex queries) rather than just simple basic queries. The architecture also includes a self-attention based database schema encoder which enables the text-to-SQL architecture to generalize to unseen databases.

Figure 1:
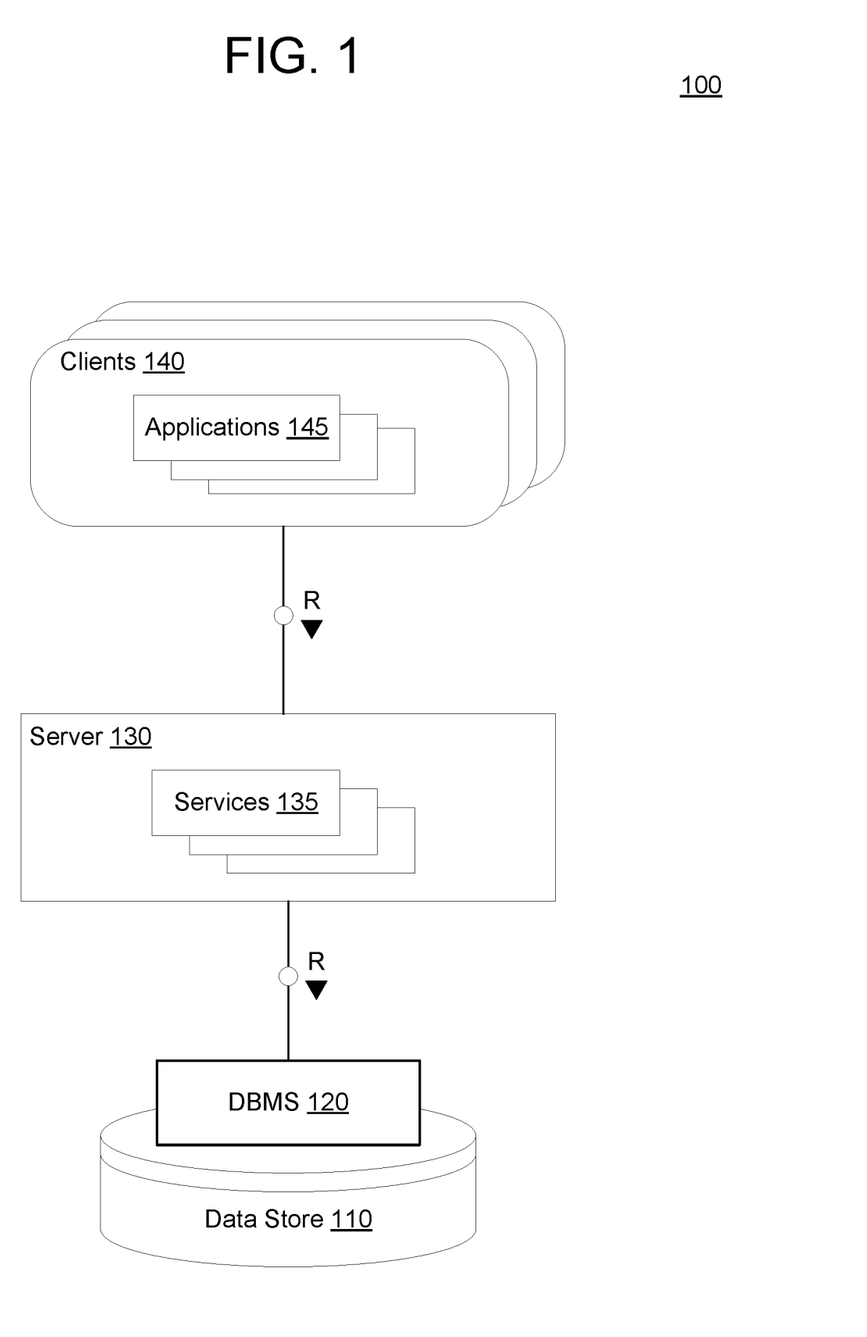
FIG. 1 is a diagram illustrating a database system architecture in accordance with an example embodiment.

FIG. 1 illustrates a system architecture of a database 100 in accordance with an example embodiment. It should be appreciated that the embodiments are not limited to architecture 100 or to a database architecture, however, FIG. 1 is shown for purposes of example. Referring to FIG. 1, the architecture 100 includes a data store 110, a database management system (DBMS) 120, a server 130, services 135, clients 140, and applications 145. Generally, services 135 executing within server 130 receive requests from applications 145 executing on clients 140 and provides results to the applications 145 based on data stored within data store 110. For example, server 130 may execute and provide services 135 to applications 145. Services 135 may comprise server-side executable program code (e.g., compiled code, scripts, etc.) which provide functionality to applications 145 by providing user interfaces to clients 140, receiving requests from applications 145 (e.g., drag-and-drop operations), retrieving data from data store 110 based on the requests, processing the data received from data store 110, and providing the processed data to applications 145.

In one non-limiting example, a client 140 may execute an application 145 to perform visual analysis via a user interface displayed on the client 140 to view analytical information such as charts, graphs, tables, and the like, based on the underlying data stored in the data store 110. The application 145 may pass analytic information to one of services 135 based on input received via the client 140. A structured query language (SQL) query may be generated based on the request and forwarded to DBMS 120. DBMS 120 may execute the SQL query to return a result set based on data of data store 110, and the application 145 creates a report/visualization based on the result set. In this example, DBMS 120 may perform a query optimization on the SQL query to determine a most optimal alternative query execution plan.

An application 145 and/or a service 135 may be used to identify and combine features for training a machine learning model. Raw data from various sources may be stored in the data store 110. In this example, the application 145 and/or the service 135 may extract core features from the raw data and also derive features from the core features. The features may be stored as database tables within the data store 110. For example, a feature may be assigned to its own table with one or more columns of data.

The services 135 executing on server 130 may communicate with DBMS 120 using database management interfaces such as, but not limited to, Open Database Connectivity (ODBC) and Java Database Connectivity (JDBC) interfaces. These types of services 135 may use SQL and SQL script to manage and query data stored in data store 110. The DBMS 120 serves requests to query, retrieve, create, modify (update), and/or delete data from database files stored in data store 110, and also performs administrative and management functions. Such functions may include snapshot and backup management, indexing, optimization, garbage collection, and/or any other database functions that are or become known.

Server 130 may be separated from or closely integrated with DBMS 120. A closely-integrated server 130 may enable execution of services 135 completely on the database platform, without the need for an additional server. For example, server 130 may provide a comprehensive set of embedded services which provide end-to-end support for Web-based applications. The services 135 may include a lightweight web server, configurable support for Open Data Protocol, server-side JavaScript execution and access to SQL and SQLScript. Server 130 may provide application services (e.g., via functional libraries) using services 135 that manage and query the database files stored in the data store 110. The application services can be used to expose the database data model, with its tables, views and database procedures, to clients 140. In addition to exposing the data model, server 130 may host system services such as a search service, and the like.

Data store 110 may be any query-responsive data source or sources that are or become known, including but not limited to a SQL relational database management system. Data store 110 may include or otherwise be associated with a relational database, a multi-dimensional database, an Extensible Markup Language (XML) document, or any other data storage system that stores structured and/or unstructured data. The data of data store 110 may be distributed among several relational databases, dimensional databases, and/or other data sources. Embodiments are not limited to any number or types of data sources.

In some embodiments, the data of data store 110 may include files having one or more of conventional tabular data, row-based data, column-based data, object-based data, and the like. According to various aspects, the files may be database tables storing data sets. Moreover, the data may be indexed and/or selectively replicated in an index to allow fast searching and retrieval thereof. Data store 110 may support multi-tenancy to separately support multiple unrelated clients by providing multiple logical database systems which are programmatically isolated from one another. Furthermore, data store 110 may support multiple users that are associated with the same client and that share access to common database files stored in the data store 110.

Data items (e.g., data records, data entries, etc.) may be stored, modified, deleted, and the like, within the data store 110. As an example, data items may be created, written, modified, or deleted based on instructions from any of the applications 145, the services 135, and the like. Each data item may be assigned a globally unique identifier (GUID) by an operating system, or other program of the database 100. The GUID is used to uniquely identify that data item from among all other data items stored within the database 100. GUIDs may be created in multiple ways including, but not limited to, random, time-based, hardware-based, content-based, a combination thereof, and the like.

The architecture 100 may include metadata defining objects which are mapped to logical entities of data store 110. The metadata may be stored in data store 110 and/or a separate repository (not shown). The metadata may include information regarding dimension names (e.g., country, year, product, etc.), dimension hierarchies (e.g., country, state, city, etc.), measure names (e.g., profit, units, sales, etc.) and any other suitable metadata. According to some embodiments, the metadata includes information associating users, queries, query patterns and visualizations. The information may be collected during operation of system and may be used to determine a visualization to present in response to a received query, and based on the query and the user from whom the query was received.

Each of clients 140 may include one or more devices executing program code of an application 145 for presenting user interfaces to allow interaction with application server 130. The user interfaces of applications 145 may comprise user interfaces suited for reporting, data analysis, and/or any other functions based on the data of data store 110. Presentation of a user interface may include any degree or type of rendering, depending on the type of user interface code generated by server 130. For example, a client 140 may execute a Web Browser to request and receive a Web page (e.g., in HTML format) from application server 130 via HTTP, HTTPS, and/or Web Socket, and may render and present the Web page according to known protocols.

One or more of clients 140 may also or alternatively present user interfaces by executing a standalone executable file (e.g., an .exe file) or code (e.g., a JAVA applet) within a virtual machine. Clients 140 may execute applications 145 which perform merge operations of underlying data files stored in data store 110. Furthermore, clients 140 may execute the conflict resolution methods and processes described herein to resolve data conflicts between different versions of a data file stored in the data store 110. A user interface may be used to display underlying data records, and the like.

Figure 2:
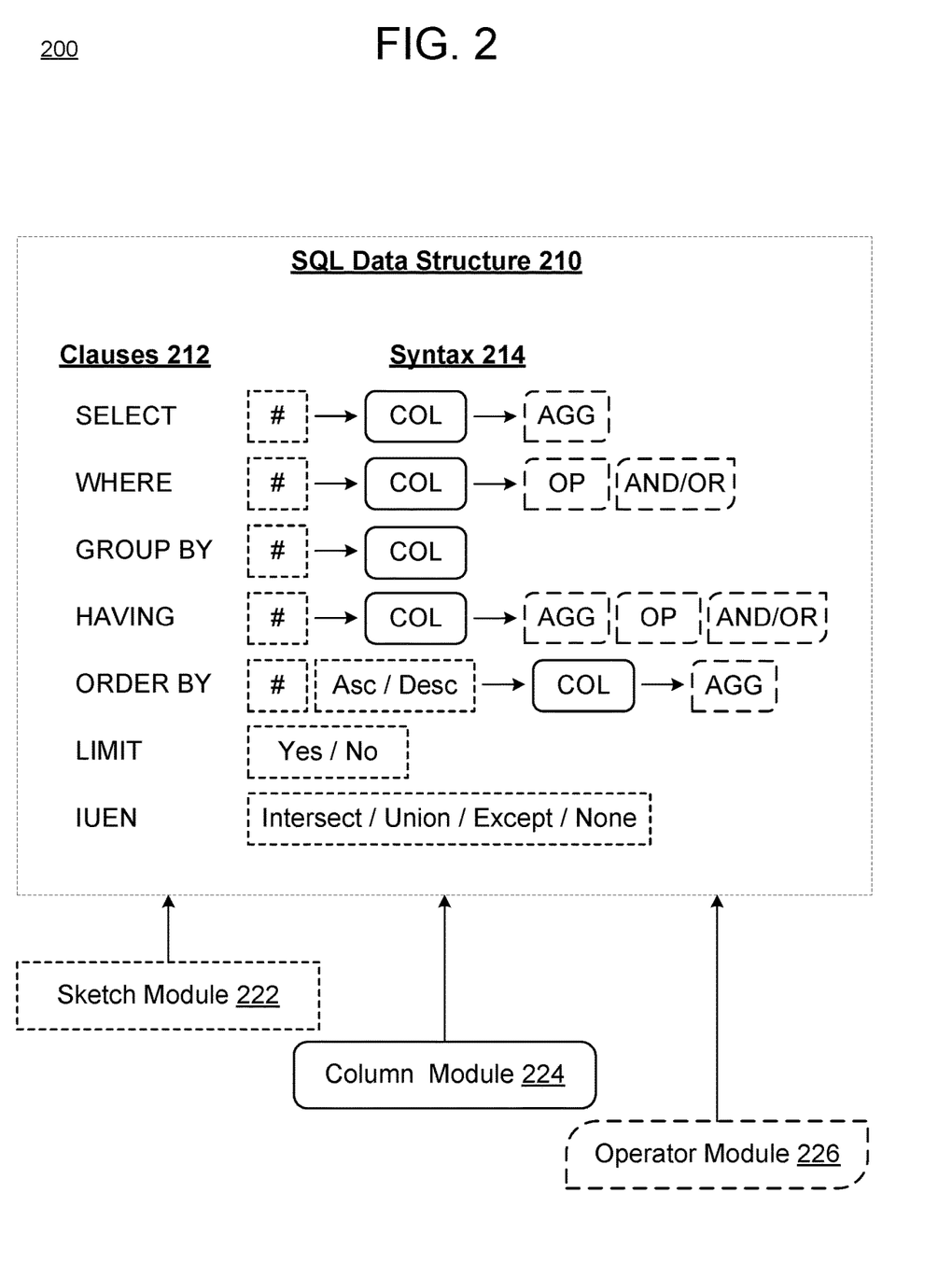
FIG. 2 is a diagram illustrating a process of clause-wise text-to-SQL generation in accordance with an example embodiment.

FIG. 2 illustrates a process 200 of clause-wise text-to-SQL generation in accordance with an example embodiment. Referring to FIG. 2, the process 200 predicts a data structure 210 of a SQL operation such as a SQL query. The data structure 210 (also referred to as a skeleton) may include a plurality of clauses 212 (also referred to as statements), and syntax 214 associated with each of the clauses 212. According to various embodiments, a sketch module 222 may predict a sketch of each of the different clauses 212. The sketch attributes may be different based on the clause 212. For example, the sketch module 222 may include a plurality of sub-modules which are dedicated to one of the predictions. In the example of FIG. 2, the sketch module 222 performs eight (8) predictions including predicting a number of expressions in five (5) of the clauses (SELECT, WHERE, GROUP BY, HAVING, and ORDER BY), determining whether an ORDER BY clause is ascending or descending, determining whether a LIMIT clause is present, and determining whether an INTERSECT, UNION, or EXCEPT operator is present.

A column module 224 may determine column names corresponding to the expressions predicted by the sketch module 222. For example, the sketch module 222 may determine how many column names (expressions) exist in a clause 212, while the column module 224 may fill-in the empty slots corresponding to the expressions with content (text data of column names) from a database. An operator module 226 may determine an operator associated with the different expressions (column names). The operator may specify how the data from the columns are to be combined. Examples of operators include aggregation operators such as SUM, MIN, AVG, COUNT, etc., comparison operations such as greater than (>), equal to (=), less than (<), IN, BETWEEN, etc., logical operators such as AND, OR, NOT, etc., and the like.

The example embodiments provide a new deep-learning architecture for generating a SQL operation from a natural language input. The system includes a plurality of sub-modules that generate a data structure and content SQL clause-wisely. For example, the system may train decoding modules separately for each SQL clause to fully utilize clause-dependent context. Second, the system may apply sequence-to-sequence architecture to predict column names for empty slots in the clauses because correct orderings are essential in GROUP BY and ORDER BY clauses. Furthermore, the system introduces a self-attention mechanism to efficiently encode a database schema that includes multiple tables. The result, is the generation of a complex SQL query such as shown in FIG. 2 which is generated clause-wisely. Each clause is predicted consecutively by at most three different types of modules (sketch 222, column 224, and operator 226). The same architecture may also recursively generate nested queries with temporal generated SQL as an additional input.

The architecture described herein includes three different predictive modules including the sketch module 222, the column module 224, and operation module 226. The sketch module 222 may predict the sketch of the SQL clause, the column module 224 may predict the column identifier(s) of the expressions included in each SQL clause, and the operation module 226 may predict a type of operation such as arithmetic, aggregation, comparison, etc. Each of these modules may be based on SQL grammar.

When a natural language input (question, etc.) is received, the architecture may generate the SQL syntax for each of the necessary clauses (SELECT, WHERE, ORDER BY, etc.) The architecture does not generate each clause every time, but only those necessary to perform the corresponding SQL query. Based on the table schema and the natural language text of the input, the architecture can generate the SQL syntax. In other words, the SQL clauses are filled-in based on the natural language text and the specific schema of the database where the SQL is being performed. The output is a SQL operation, query, command, etc.

Through the combining of clauses, the architecture may predict a full SQL query operation generated based therein. Each module may be used to generate each clause within the full SQL operation. In some cases not all modules may be used, but up to three modules may be used per clause. All of the modules are based on deep learning. For example, the sketch module 222 may be a text-classification model that can predict an expression(s) in each clause, whether there is an INTERSECT, UNION, or EXCEPT operator. The column module 224 may be an encoder-decoder neural network which converts the natural language into a vector (representing the meaning of the natural language) and compares the vector with the names of the tables, columns, etc. (which have also been vectorized) to find the most relevant columns in the table. The column module 224 may predict the column identifiers and the operation module 226 may predict the operator based on features in the natural language text input and the predicted columns by the column module 224.

Meanwhile, after the predictions of all the other clauses, the architecture may use a heuristic to generate the FROM clause (not shown). Here, the architecture may first collect all the columns that appear in the predicted SQL and then, perform a JOIN tables that include these predicted columns.

Figure 3:
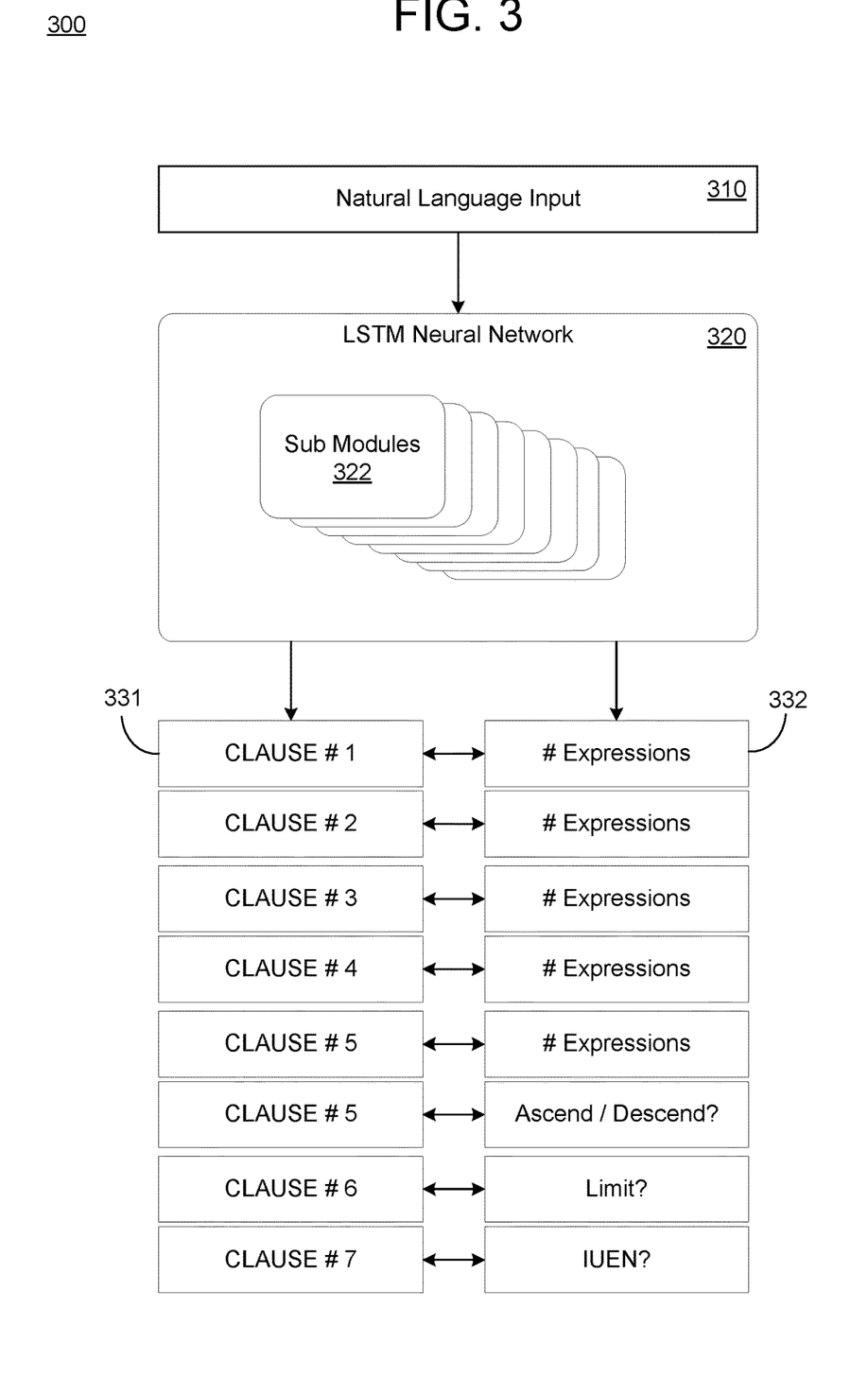
FIG. 3 is a diagram illustrating a process of sketch module predicting a data structure of a SQL operation in accordance with an example embodiment.

FIG. 3 illustrates a process 300 of sketch module 320 predicting a data structure of a SQL operation in accordance with an example embodiment. In the example of FIG. 3, the sketch module 320 includes a long short-term memory (LSTM) neural network which includes a plurality of sub-modules 322. Each sub-module may be associated with one clause from among the plurality of clauses 331 of the SQL operation. The predicted sketch 332 may be different based on the clause.

The system described herein may encode a natural language input 310 with a bidirectional LSTM neural network 320 such as shown in FIG. 3. To encode a database schema, a sketch module 320 may consider each column as a concatenated sequence of words in the table name and column name with separate tokens. The system may apply the bidirectional LSTM 320 over this sequence for each column. Then, the system may apply a self-attention mechanism over the LSTM outputs to form a summarized fixed-size vector.

In particular, the sketch module 320 may generate a clause-wise sketch of the SQL operation using a plurality of sub-modules 322. The sub-modules may be text classification modules that can predict the number of SQL expressions in a clause, whether a LIMT statement is present, whether an INTERSECT, UNION, or EXCEPT operator is present, and the like. In the example of FIG. 2, the number of sub-modules 322 may be eight (8) due to the eight different predictions, however, embodiments are not limited thereto.

All of the sub-modules may share a same model architecture but may be trained on separate data resulting in a more accurate prediction based on the particular clause that the sub-module is associated with. For classification, a bidirectional LSTM may be applied. The bidirectional LSTM may compute a sentence representation based on a weighted sum of question encoding and then apply a softmax classifier to choose the sketch.

For example, five of the sub-modules 322 may predict the number of columns/expressions in a clause. For ORDER, a sub-module 322 may predict whether the order is ascending or descending. For LIMIT, a sub-module 322 may predict whether there is a limit variable. For IUEN, a sub-module may predict whether one of these elements is present. The sketch module generates a "skeleton" for the SQL query. It generates the skeleton code for SQL. Then, the column module and operators module (further described in FIGS. 4A and 4B) fills-in the skeleton (slots) with real values from the database. This architecture enables the system to be applied to any type of database because the column module can learn the names of the database columns including column names that are unseen, etc.

Figure 4A:
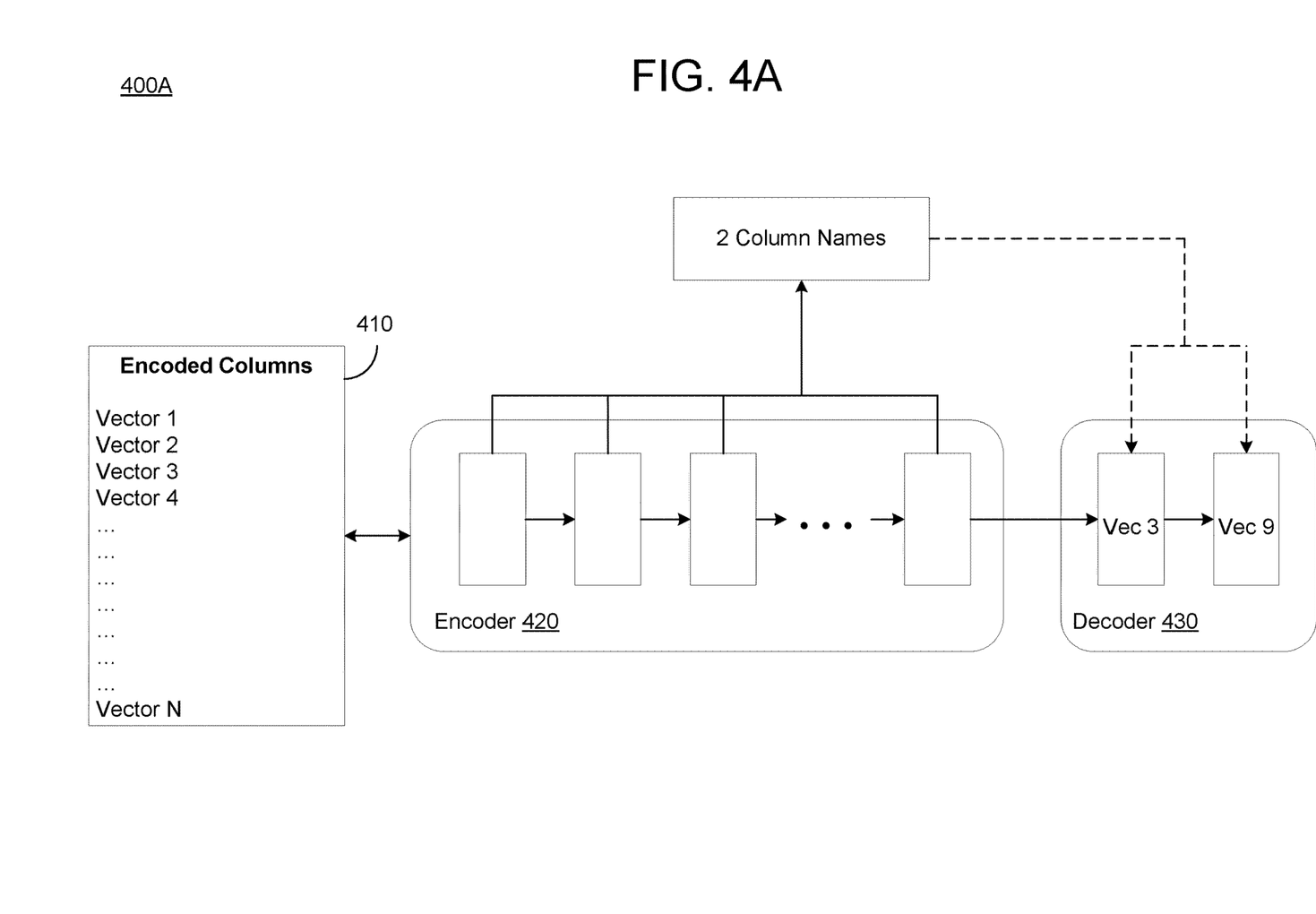
FIG. 4A is a diagram illustrating a column module predicting column names for a SQL operation in accordance with an example embodiment.
Figure 4B:
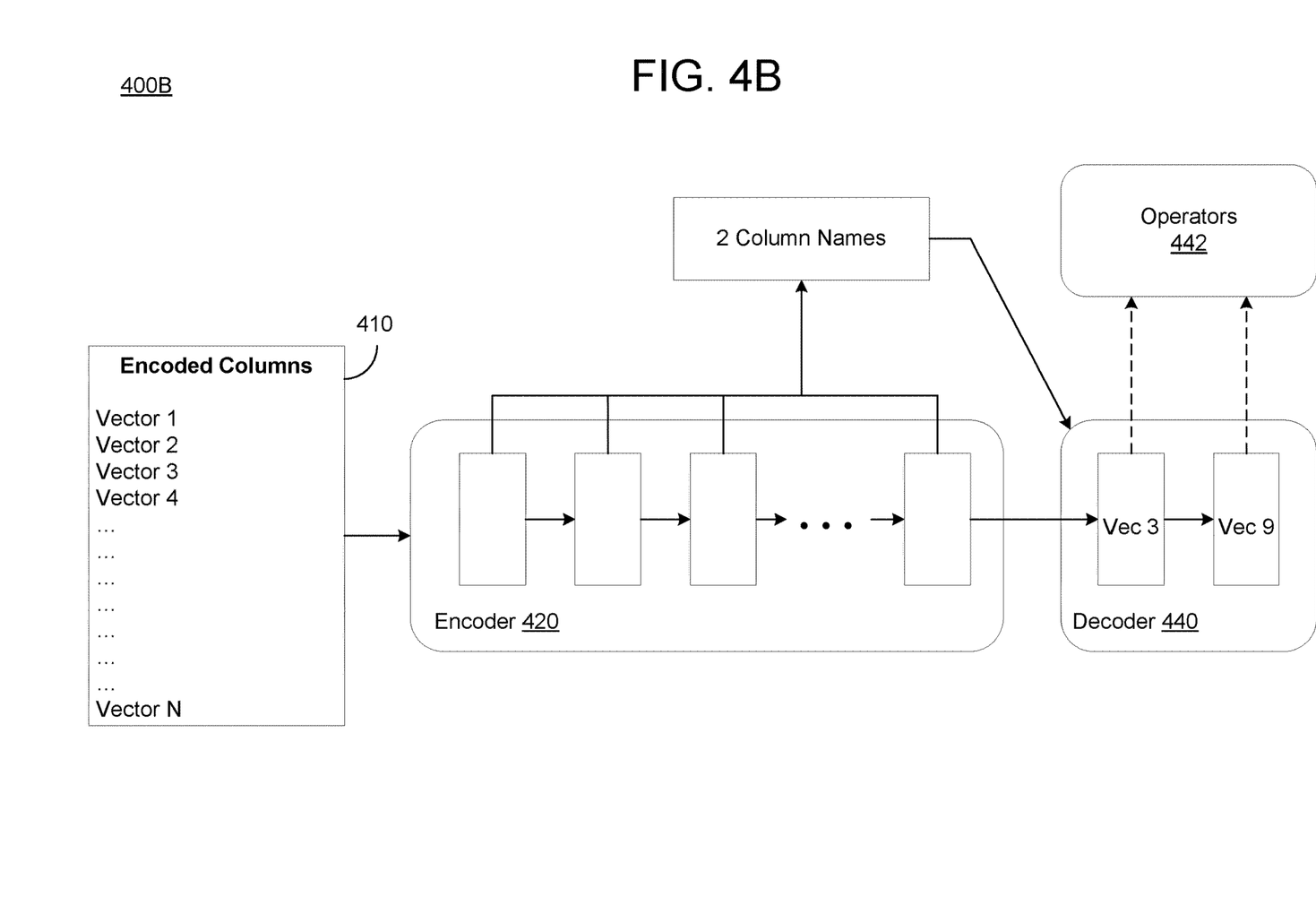
FIG. 4B is a diagram illustrating an operator module predicting an operator of a SQL operation in accordance with an example embodiment.

FIG. 4A illustrates a process 400A of a column module predicting column names for a SQL operation in accordance with an example embodiment, and FIG. 4B illustrates a process 400B of an operator module predicting an operator of a SQL operation in accordance with an example embodiment. Referring to FIGS. 4A and 4B, to predict columns and operators, the architecture may use a LSTM decoder 430 with attention mechanism where the number of decoding steps are decided by the sketch module. The architecture may train five different column prediction modules separately for five different SQL clauses, but they share the same architecture.

As noted above, the sketch module determines/predicts that a number of expressions for a SQL clause. In the examples of FIGS. 4A and 4B, the sketch module has predicted that there are two columns expressions in the natural language input. Then, the column prediction module predicts the column names corresponding to the column expression. For example, the encoder 420 may convert the table names into vector format 410 which represents a vector meaning of each column in the database. Here, a vector is the numerical conversion of the wording of the column name. The column prediction module chooses the most appropriate column name in the table for the empty slot based on the wording from the query being compared to the wording of the column names, through vector comparison (cosine similarity). In FIG. 4A, the encoder 420 encodes the natural language input into a vector, and a decoder 430 interprets the output from the encoder 420 (encoded column names 410 and encoded natural language input) and makes a column output (matches the slots to column names) by comparing the encoded column names 410 to the natural language input vector of the encoder 420. Here, the decoder 430 may identify a column name that most closely matches the corresponding natural language input.

Referring now to FIG. 4B, to predict corresponding operators 442 for each predicted column, the column module may use a decoder 440 of the same architecture as the decoder 430 in the column prediction module. The only difference is that the input of the decoder 440 is the encoding of the predicted column from the column prediction module.

Figure 4C:
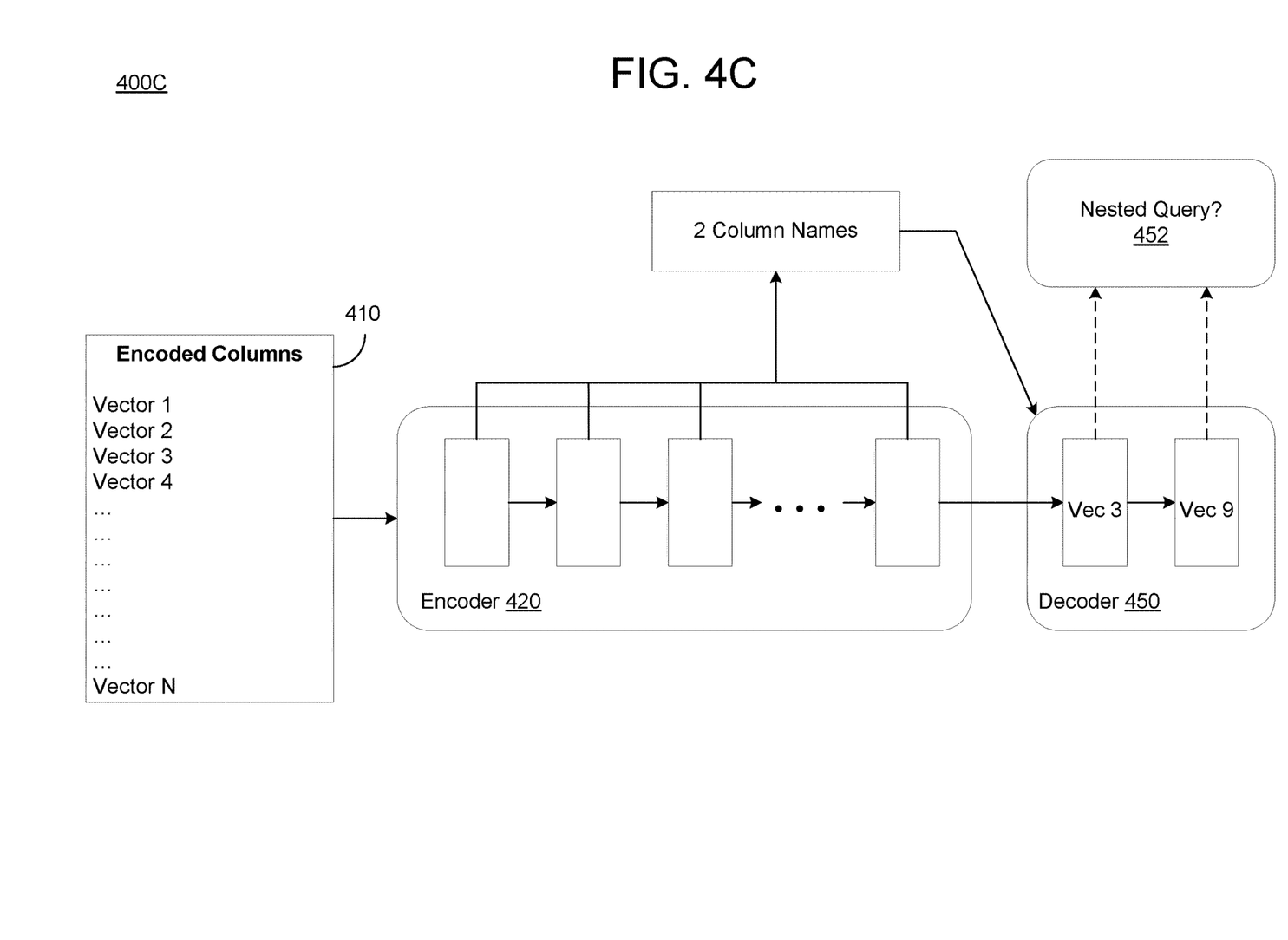
FIG. 4C is a diagram illustrating a module predicting whether a SQL operation includes a nested query in accordance with an example embodiment.

FIG. 4C is a diagram illustrating a module predicting whether a SQL operation includes a nested query in accordance with an example embodiment. To predict the presence of a sub-query (e.g., a nested query), the architecture may include another module that has the same architecture of the operator prediction module. However, instead of predicting corresponding operators for each column, a decoder 450 predicts whether each column is compared to a variable (e.g. WHERE age >3) or to a sub-query (e.g., WHERE age >(SELECT avg(age) . . . )). If the module determines the sub-query is present, the module may add a temporal sub-query token 452 to the corresponding location in the SQL output.

Additionally, if the sketch module predicts one of an INTERSECT, a UNION, or an EXCEPT operator, the sub-query module may add a sub-query token 452 after the operator. To predict a sub-query, the sub-query module may take the temporal generated SQL with the sub-query token 452 as an input in addition to a natural language input with a separate token. The input is encoded by the same way as previous described herein. Then, the rest of SQL generation process is exactly same. However, after the subquery is predicted, it replaces the sub-query token 452 in the previous generated SQL to form the final query.

Figure 5:
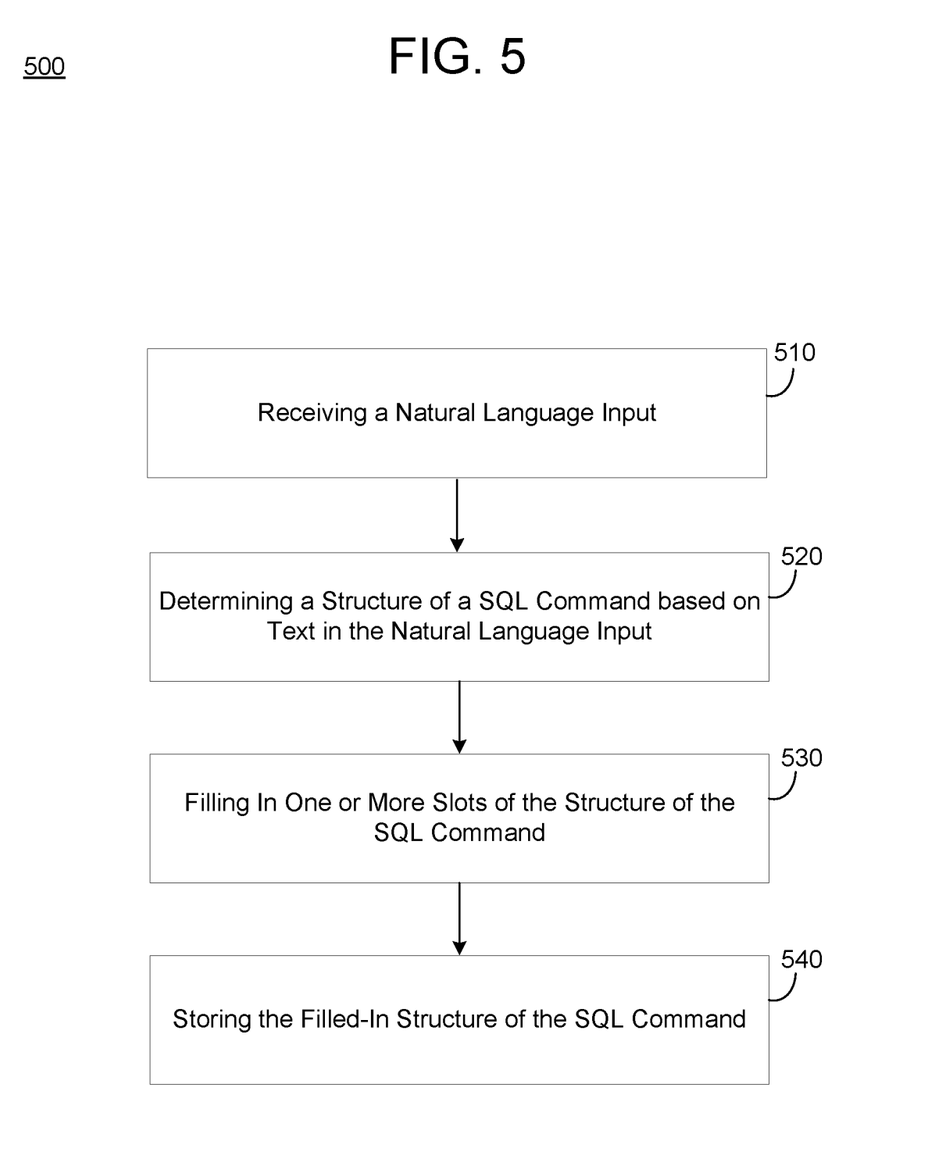
FIG. 5 is a diagram illustrating a method of generating a SQL operation from a natural language input in accordance with an example embodiment.

FIG. 5 illustrates a method 500 of generating syntax of a SQL operation from a natural language input in accordance with an example embodiment. For example, the method 500 may be performed by a software program running on a database node, a cloud platform, a server, a computing system (user device), a combination of devices/nodes, or the like. Referring to FIG. 5, in 510, the method may include receiving a natural language input. For example, the natural language input may include speech, a spoken input, a text input converted from a spoken input, and the like.

In 520, the method may include determining, via a first predictive module, a data structure of a structured query language (SQL) operation based on text included in the natural language input. In some embodiments, the first predictive module may be a LSTM neural network. For example, the determining may include predicting a number of expressions included in each of a plurality of SQL clauses of the data structure of the SQL operation via the LSTM neural network. The LSTM may include a plurality of sub-modules that correspond to a plurality of different clauses in the SQL operation including a SELECT statement, a WHERE clause, a GROUP BY clause, an ORDER BY clause, a HAVING clause, and the like.

In some embodiments, the determining may further include predicting, via a sub-module of the first predictive module, whether or not an ORDER BY clause of the data structure of the SQL operation is ascending or descending based on the text included in the natural language input. In some embodiments, the determining may further include predicting, via a sub-module of the first predictive module, whether or not the data structure of the SQL operation includes a limit variable based on the text included in the natural language input.

In some embodiments, the determining may further include predicting, via a sub-module of the first predictive module, whether or not the data structure of the SQL operation includes one or more of an INTERSECT, a UNION, and an EXCEPT operator, based on the text included in the natural language input. In some embodiments, the determining may further include predicting, via a fourth predictive module, whether the data structure of the SQL operation includes a nested query.

In 530, the method may include filling in, via a second predictive module, one or more empty slots of the data structure of the SQL operation with text based on column names of a database and the text included in the natural language input. In 540, the method may include storing the filled-in data structure of the SQL operation in a storage. In some embodiments, the filling in may include filling in empty slots corresponding to expressions in the data structure of the SQL operation with column names of the database via an encoder-decoder neural network. In some embodiments, the filling in may include converting, via the second predictive module, the column names of the database into vectors and performing a similarity comparison with a vector generated from the natural language input.

Although not shown in FIG. 5, in some embodiments, the method may further include predicting, via a third predictive module, one or more operators included within an SQL clause of the data structure of the SQL operation based on the one or more filled-in slots of the data structure of the SQL operation. The third module may include a similar module as the second module but may be configured to predict operators based on the column names predicted via the second predictive module.

Figure 6:
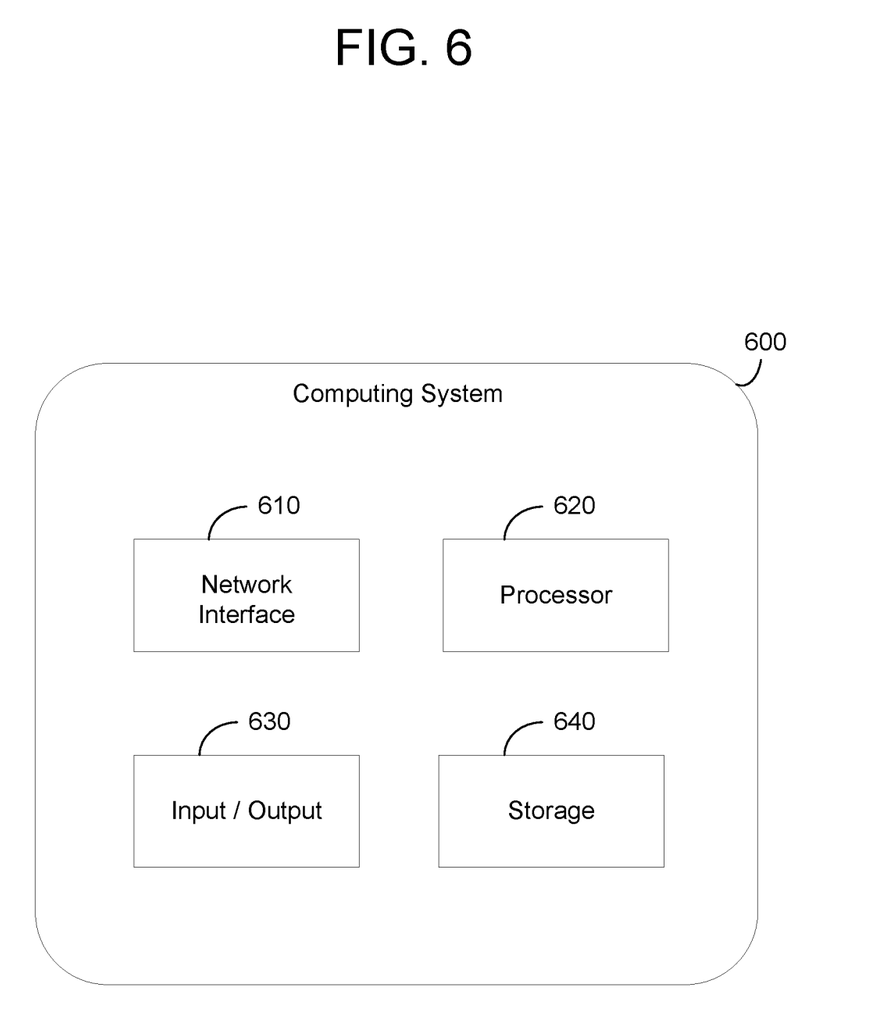
FIG. 6 is a diagram illustrating a computing system for use in the examples herein in accordance with an example embodiment.

FIG. 6 illustrates a computing system 600 that may be used in any of the methods and processes described herein, in accordance with an example embodiment. For example, the computing system 600 may be a database node, a server, a cloud platform, or the like. In some embodiments, the computing system 600 may be distributed across multiple computing devices such as multiple database nodes. Referring to FIG. 6, the computing system 600 includes a network interface 610, a processor 620, an input/output 630, and a storage device 640 such as an in-memory storage, and the like. Although not shown in FIG. 6, the computing system 600 may also include or be electronically connected to other components such as a microphone, a display, an input unit(s), a receiver, a transmitter, a persistent disk, and the like. The processor 620 may control the other components of the computing system 600.

The network interface 610 may transmit and receive data over a network such as the Internet, a private network, a public network, an enterprise network, and the like. The network interface 610 may be a wireless interface, a wired interface, or a combination thereof. The processor 620 may include one or more processing devices each including one or more processing cores. In some examples, the processor 620 is a multicore processor or a plurality of multicore processors. Also, the processor 620 may be fixed or it may be reconfigurable. The input/output 630 may include an interface, a port, a cable, a bus, a board, a wire, and the like, for inputting and outputting data to and from the computing system 600. For example, data may be output to an embedded display of the computing system 600, an externally connected display, a display connected to the cloud, another device, and the like. The network interface 610, the input/output 630, the storage 640, or a combination thereof, may interact with applications executing on other devices.

The storage device 640 is not limited to a particular storage device and may include any known memory device such as RAM, ROM, hard disk, and the like, and may or may not be included within a database system, a cloud environment, a web server, or the like. The storage 640 may store software modules or other instructions which can be executed by the processor 620 to perform the method shown in FIG. 5. In various examples, the storage 640 may include a data store having a plurality of tables, partitions and sub-partitions. The storage 640 may be used to store database records, items, entries, and the like. Also, the storage 640 may be queried using SQL commands.

According to various embodiments, the storage 640 may store the various predictive modules described herein. Furthermore, the processor 620 may be configured to execute the predictive modules to perform text-to-SQL generations. The processor 620 may receive a natural language input which is spoken by a user. In some embodiments, the natural language input may be the raw audio which the processor 620 may convert into text. As another example, the processor 620 may receive the text of the natural language input after it has already been converted. The processor 620 may determine, via a first predictive module, a data structure of a SQL operation based on text included in the natural language input. Furthermore, the processor 620 may fill in, via a second predictive module, one or more empty slots of the data structure of the SQL operation with text based on column names from a database and the text included in the natural language input. Further, the storage may store the filled-in data structure of the SQL operation.

In some embodiments, the processor 620 may predict a number of expressions included in each of a plurality of SQL clauses of the data structure of the SQL operation via a long short-term memory (LSTM) neural network which corresponds to the first predictive module. In some embodiments, the processor 620 may fill in empty slots corresponding to expressions in the data structure of the SQL operation with column names of the database via an encoder-decoder neural network which corresponds to the second predictive module. In some embodiments, the processor 620 may convert, via the second predictive module, the column names of the database into vectors and perform a similarity comparison with a vector generated from the natural language input. In some embodiments, the processor 620 may predict, via a third predictive module, one or more operators included within an SQL clause of the data structure of the SQL operation based on the one or more filled-in slots of the data structure of the SQL operation.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
a processor configured to
receive a natural language input,
determine, via execution of a long short term memory (LSTM) neural network, a skeleton data structure of a structured query language (SQL) operation which includes an unfilled SQL clause based on text included in the natural language input,
identify, via execution of the LSTM neural network, a missing column name exists in the unfilled SQL clause and insert an empty slot into the unfilled SQL clause within the skeleton data structure for the missing column name,
convert a plurality of column names from a database into column name vectors via an encoder of an encoder-decoder neural network,
input the column name vectors and a vector of the natural language input into a decoder of the encoder-decoder neural network,
select a column name from among the plurality of column names which most closely matches one or more words in the natural language input via a decoder of the encoder-decoder neural network based on a comparison of the column name vectors output from the encoder and the natural language input vector; and
fill in the empty slot corresponding to the missing column name in skeleton data structure with the selected column name from the decoder; and
a memory configured to store the filled-in skeleton data structure of the SQL operation.

2. The computing system of claim 1, wherein the processor is further configured to predict which expressions are included in a plurality of unfilled SQL clauses of the skeleton data structure of the SQL operation via the LSTM neural network.

3. The computing system of claim 1, wherein the processor is further configured to fill in a plurality of empty slots in the skeleton data structure corresponding to a plurality of SQL clauses, respectively, with additional text.

4. The computing system of claim 1, wherein the processor is configured to perform, via the decoder, a cosine similarity comparison between the natural language input atoll vector and the column name vectors output from the encoder to select the column name.

5. The computing system of claim 1, wherein the processor is further configured to predict one or more operators included within the unfilled SQL clause of the skeleton data structure of the SQL operation based on one or more other filled-in SQL clauses of the skeleton data structure of the SQL operation.

6. The computing system of claim 1, wherein the processor is further configured to predict, via the LSTM neural network, whether or not an ORDER BY clause of the skeleton data structure of the SQL operation is ascending or descending based on the text included in the natural language input.

7. The computing system of claim 1, wherein the processor is further configured to predict, via the LSTM neural network, whether or not the skeleton data structure of the SQL operation includes a limit variable based on the text included in the natural language input.

8. The computing system of claim 1, wherein the processor is further configured to predict, via the LSTM neural network, whether or not the skeleton data structure of the SQL operation includes one or more of an INTERSECT, a UNION, and an EXCEPT operator, based on the text included in the natural language input.

9. The computing system of claim 1, wherein the processor is further configured to predict whether the skeleton data structure of the SQL operation includes a nested query.

10. A method comprising:
receiving a natural language input;
determining, via execution of a long short term memory (LSTM) neural network, a skeleton data structure of a structured query language (SQL) operation which includes an unfilled SQL clause based on text included in the natural language input;
identifying, via execution of the LSTM neural network, a missing column name exists in the unfilled SQL clause and insert an empty slot into the unfilled SQL clause within the skeleton data structure for the missing column name,
converting a plurality of column names from a database into column name vectors via an encoder of an encoder-decoder neural network;
inputting the column name vectors and a vector of the natural language input into a decoder of the encoder-decoder neural network;
selecting a column name from among the plurality of column names that most closely matches one or more words in the natural language input via a decoder of the encoder-decoder neural network based on a comparison of the column name vectors output from the encoder and a vector of the natural language input vector;
filling in the empty slot corresponding to the missing column name in skeleton data structure with the selected column name from the decoder; and
storing the filled-in skeleton data structure of the SQL operation in a storage.

11. The method of claim 10, wherein the determining further comprises predicting which expressions are included in a plurality of unfilled SQL clauses of the skeleton data structure of the SQL operation via the LSTM neural network.

12. The method of claim 10, wherein the filling in further comprises filling in a plurality of empty slots in the skeleton data structure corresponding to plurality of unfilled SQL clauses, respectively, with additional text.

13. The method of claim 10, wherein the filling in further comprises performing, via the decoder, a cosine similarity comparison between the natural language input vector and the column name vectors output from the encoder to select the column name.

14. The method of claim 10, further comprising predicting one or more operators included within the unfilled SQL clause of the skeleton data structure of the SQL operation based on one or more other filled-in slots of the skeleton data structure of the SQL operation.

15. The method of claim 10, wherein the determining comprises predicting, via the LSTM neural network, whether or not an ORDER BY clause of the skeleton data structure of the SQL operation is ascending or descending based on the text included in the natural language input.

16. The method of claim 10, wherein the determining comprises predicting, via the LSTM neural network, whether or not the skeleton data structure of the SQL operation includes a limit variable based on the text included in the natural language input.

17. The method of claim 10, wherein the determining comprises predicting, via the LSTM neural network, whether or not the skeleton data structure of the SQL operation includes one or more of an INTERSECT, a UNION, and an EXCEPT operator, based on the text included in the natural language input.

18. The method of claim 10, wherein the determining comprises predicting whether the skeleton data structure of the SQL operation includes a nested query.

19. A non-transitory computer-readable medium comprising instructions which when executed by a processor cause a computer to perform a method comprising:
receiving a natural language input;
determining, via execution of a long short term memory (LSTM) neural network, a skeleton data structure of a structured query language (SQL) operation which includes an unfilled SQL clause based on text included in the natural language input;
identifying, via execution of the LSTM neural network, a missing column name exists in the unfilled SQL clause and insert an empty slot into the unfilled SQL clause within the skeleton data structure for the missing column name;
converting a plurality of column names from a database into vectors via an encoder of an encoder-decoder neural network;
inputting the column name vectors and a vector of the natural language input into a decoder of the encoder-decoder neural network;
selecting a column name from among the plurality of column names which most closely matches one or more words in the natural language input via a decoder of the encoder-decoder neural network based on a comparison of the column name vectors output from the encoder and the natural language input vector;
filling in the empty slot corresponding to the missing column name in skeleton data structure of the SQL operation with the selected column name from the decoder; and
storing the filled-in skeleton data structure of the SQL operation in a storage.

20. The non-transitory computer-readable medium of claim 19, wherein the determining further comprises predicting which expressions are included in a plurality of unfilled SQL clauses within the skeleton data structure of the SQL operation via the LSTM neural network.

* * * * *